(12) United States Patent
Bae et al.

(10) Patent No.: US 10,002,590 B2
(45) Date of Patent: Jun. 19, 2018

(54) DISPLAY DEVICE FOR SENSING GESTURE AND METHOD OF DRIVING THE SAME

(71) Applicant: LG DISPLAY CO., LTD., Seoul (KR)

(72) Inventors: Sanghyuck Bae, Paju-si (KR); Juhan Kim, Bucheon-si (KR); Jinseong Kim, Goyang-si (KR); Seongkyu Kang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days. days.

(21) Appl. No.: 14/457,999

(22) Filed: Aug. 12, 2014

(65) Prior Publication Data
US 2015/0138173 A1 May 21, 2015

(30) Foreign Application Priority Data

Nov. 19, 2013 (KR) .................. 10-2013-0140535

(51) Int. Cl.
*G06F 3/041* (2006.01)
*G06F 3/045* (2006.01)
*G09G 5/18* (2006.01)
*G06F 3/044* (2006.01)
*G09G 3/3275* (2016.01)
*G09G 3/36* (2006.01)
*G06F 3/01* (2006.01)
*G02F 1/133* (2006.01)

(52) U.S. Cl.
CPC .............. *G09G 5/18* (2013.01); *G06F 3/044* (2013.01); *G06F 3/0416* (2013.01); *G09G 3/3275* (2013.01); *G09G 3/3685* (2013.01); *G02F 2001/13312* (2013.01); *G06F 3/017* (2013.01); *G09G 3/3688* (2013.01)

(58) Field of Classification Search
CPC ...... G09G 3/3685; G09G 3/3275; G09G 5/18; G09G 3/3688
See application file for complete search history.

(56) References Cited

U.S. PATENT DOCUMENTS

| | | | |
|---|---|---|---|
| 9,189,113 B2 * | 11/2015 | Yoshimura | .............. G06F 3/044 |
| 2007/0120789 A1 | 5/2007 | Lee et al. | |
| 2009/0002336 A1 | 1/2009 | Choi et al. | |
| 2011/0090174 A1 * | 4/2011 | Lin | ........................ G06F 3/0412 |
| | | | 345/174 |
| 2012/0306926 A1 * | 12/2012 | Millet | ................... G06T 3/4007 |
| | | | 345/660 |
| 2013/0147744 A1 * | 6/2013 | Kim | ....................... G06F 3/0412 |
| | | | 345/173 |

(Continued)

FOREIGN PATENT DOCUMENTS

| CN | 1818842 A | 8/2006 |
|---|---|---|
| CN | 101952792 A | 1/2011 |

(Continued)

*Primary Examiner* — Kwang-su Yang
(74) *Attorney, Agent, or Firm* — Dentons US LLP (57) ABSTRACT

A display device and a method for driving the same are discussed. The display device includes a display panel including a common electrode commonly connected to pixels, a display driving circuit for applying a data voltage to the pixels during a vertical active time, and a sensor driving circuit which applies a gesture sensing driving signal to the common electrode during a vertical blank time and senses a gesture input.

17 Claims, 8 Drawing Sheets (56) References Cited

U.S. PATENT DOCUMENTS

| | | | |
|---|---|---|---|
| 2013/0176251 A1* | 7/2013 | Wyatt | G09G 5/18 345/173 |
| 2013/0222279 A1 | 8/2013 | Chang et al. | |
| 2013/0249853 A1 | 9/2013 | Tanaka | |
| 2013/0265256 A1 | 10/2013 | Nathan et al. | |
| 2013/0285952 A1 | 10/2013 | Huang et al. | |
| 2013/0293454 A1* | 11/2013 | Jeon | G06F 3/017 345/156 |
| 2014/0049509 A1* | 2/2014 | Shepelev | G06F 3/044 345/174 |
| 2014/0232955 A1* | 8/2014 | Roudbari | G06F 3/041 349/12 |
| 2014/0253525 A1* | 9/2014 | Munechika | G09G 3/3611 345/204 |
| 2015/0130764 A1* | 5/2015 | Woolley | G06F 3/044 345/174 |
| 2015/0177887 A1* | 6/2015 | Schwartz | G06F 3/0418 345/174 |
| 2015/0185926 A1* | 7/2015 | Shepelev | G06F 3/044 345/174 |
| 2015/0302830 A1* | 10/2015 | Shepelev | G06F 3/044 345/174 |

FOREIGN PATENT DOCUMENTS

| | | |
|---|---|---|
| CN | 102033348 A | 4/2011 |
| CN | 102445799 A | 5/2012 |
| JP | 2003066417 A | 3/2003 |
| JP | 2009244958 A | 10/2009 |
| JP | 2010277443 A | 12/2010 |
| TW | 201344526 A | 11/2013 |

* cited by examiner

DISPLAY DEVICE FOR SENSING GESTURE AND METHOD OF DRIVING THE SAME

This application claims the benefit of Korean Patent Application No. 10-2013-0140535 filed on Nov. 19, 2013, the entire contents of which are incorporated herein by reference for all purposes as if fully set forth herein.

BACKGROUND OF THE INVENTION

Field of the Invention

The present invention relates to a display device and a method for driving the same.

Discussion of the Related Art

A user interface (UI) is configured so that users are able to communicate with various electronic devices and thus can easily and comfortably control the electronic devices as they desire. Examples of the user interface include a keypad, a keyboard, a mouse, an on-screen display (OSD), and a remote controller having an infrared communication function or a radio frequency (RF) communication function. User interface technology has continuously expanded to increase a user's sensibility and handling convenience. The user interface has been developed to include touch UI, voice recognition UI, 3D UI, etc. A gesture UI for sensing a user's gestures has been recently applied to household appliances.

The gesture UI senses the user's gestures or object's movement on a space using a camera or a motion sensor. A separate sensor for the gesture sensing has to be added so as to implement the gesture UI in a display device. The addition of the separate sensor results in an increase in the cost of the display device.

SUMMARY OF THE INVENTION

In one aspect, there is a display device comprising a display panel including a common electrode commonly connected to pixels, a display driving circuit configured to apply a data voltage to the pixels during the vertical active time, and a sensor driving circuit configured to apply a gesture sensing driving signal to the common electrode during the vertical blank time and sense a gesture input.

In another aspect, there is a method for driving a display device including a common electrode commonly connected to pixels, comprising applying a data voltage to the pixels during the vertical active time, and applying a gesture sensing driving signal to the common electrode during the vertical blank time and sensing a gesture input.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

A display device according to an exemplary embodiment of the invention may be implemented as a flat panel display, such as a liquid crystal display (LCD) and an organic light emitting diode (OLED) display.

The display device according to the embodiment of the invention implements a gesture sensor using components for driving pixels of a display panel and does not add a separate gesture sensor. The display device according to embodiments of the invention senses gestures during a blank period, in which image data is not input, so as not to reduce a length of a display driving period and not to affect a display drive.

A gesture sensor according to the embodiments of the invention may be implemented as a capacitive sensor. The capacitive sensor may be implemented as a self-capacitive sensor or a mutual capacitive sensor. The self-capacitive sensors are respectively connected to sensor lines along one direction. The mutual capacitive sensor is formed at a crossing of two sensor lines, that are perpendicular to each other with a dielectric layer interposed therebetween.

Reference will now be made in detail to embodiments of the invention, examples of which are illustrated in the accompanying drawings. Wherever possible, the same reference numbers will be used throughout the drawings to refer to the same or like parts. Detailed descriptions of known arts will be omitted.

As shown in FIGS. 1 to 4, the display device according to the embodiment of the invention includes a display panel 100, a display driving circuit (202, 204, 206), a sensor driving circuit 300, and the like.

A pixel array of the display panel 100 includes pixels PIX formed in pixel areas defined by data lines D1 to Dm (where m is a positive integer) and gate lines G1 to Gn (where n is a positive integer). The pixels PIX may be implemented as pixels of the LCD shown in FIG. 2 or pixels of the OLED display shown in FIG. 3.

Figure 2:
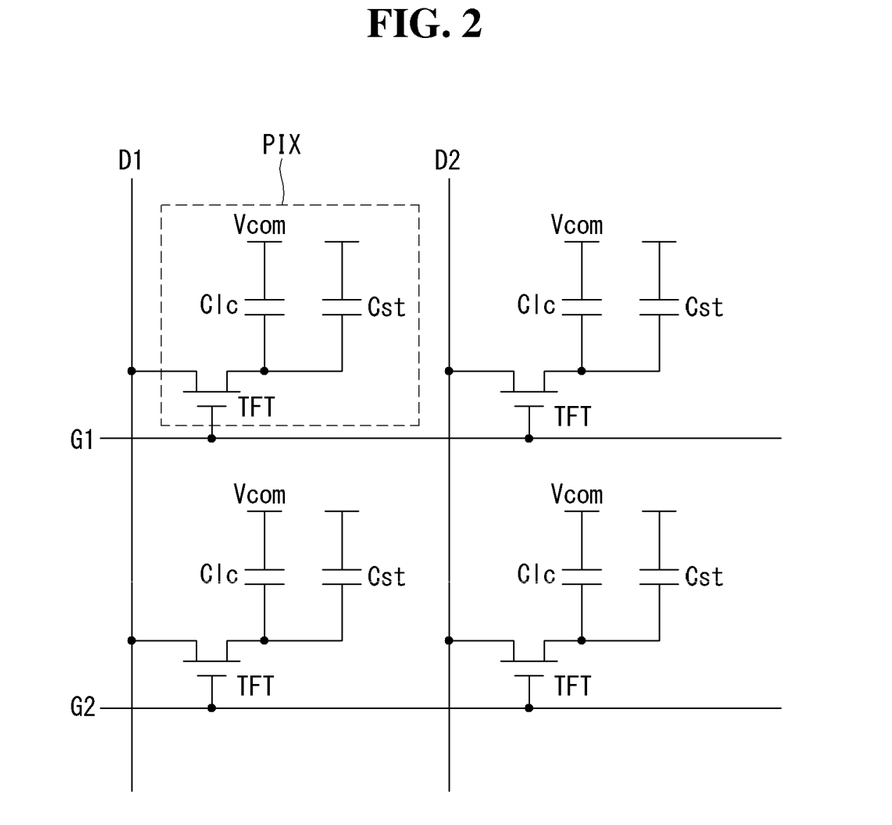
FIG. 2 is an equivalent circuit diagram showing pixels of a liquid crystal display (LCD)

As shown in FIG. 2, the pixel PIX of the LCD includes thin film transistors (TFTs) formed at crossings of the data lines D1 to Dm and the gate lines G1 to Gn, a pixel electrode charged to a data voltage, a common electrode to which a common voltage Vcom is supplied, a storage capacitor Cst which is connected to the pixel electrode and holds a voltage of a liquid crystal cell, and the like.

Figure 3:
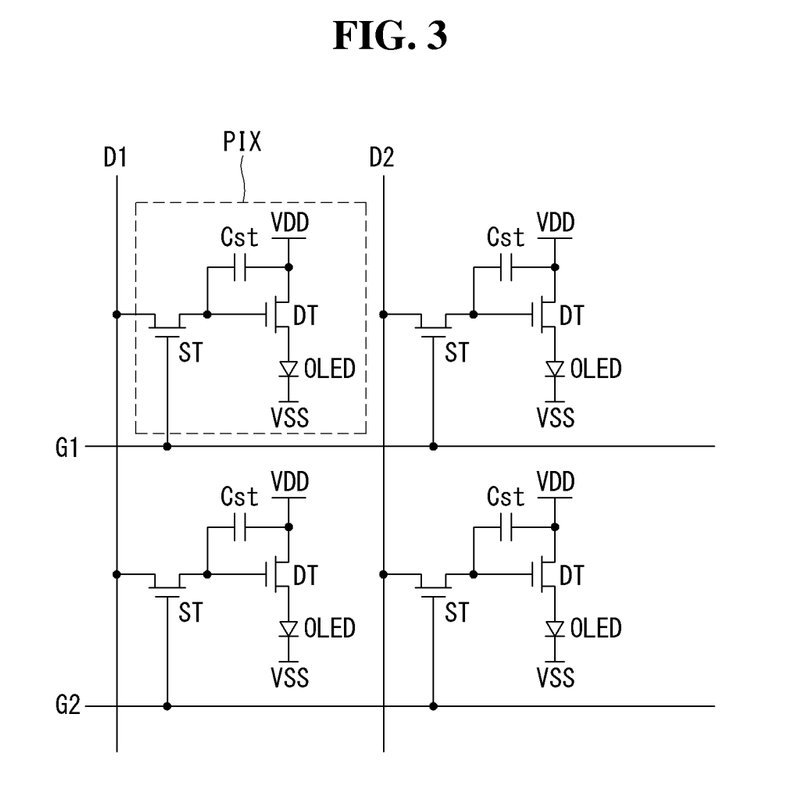
FIG. 3 is an equivalent circuit showing pixels of an organic light emitting diode (OLED) display.

As shown in FIG. 3, the pixel PIX of the OLED display includes a switching TFT ST, a driving TFT DT connected to the switching TFT ST, an OLED and a storage capacitor Cst which are connected to the driving TFT DT, electrodes to which a high potential pixel power voltage VDD and a low potential pixel power voltage VSS are supplied, and the like. Each pixel PIX may further include a compensation circuit which senses and compensates a threshold voltage and mobility of the driving TFT DT.

The display panel 100 may further include color filters and black matrixes. When the LCD is implemented as the display device, a backlight unit may be disposed under a back surface of the display panel 100.

Figure 1:
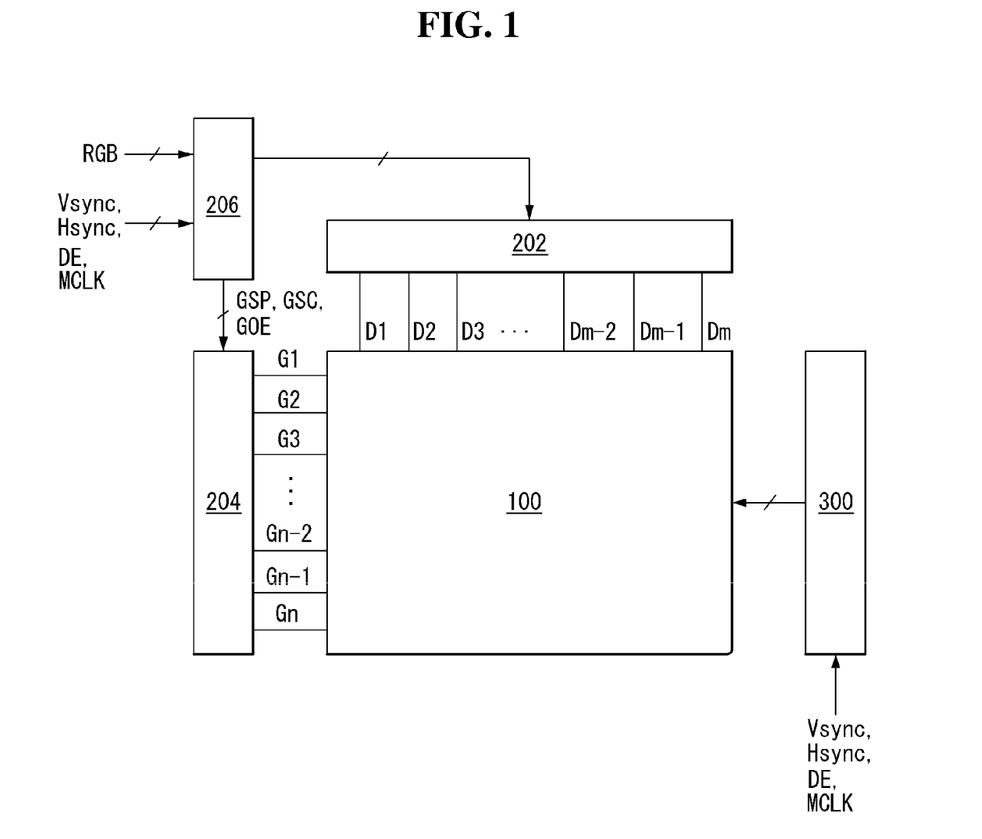
FIG. 1 is a block diagram of a display device according to an exemplary embodiment of the invention.

The pixels PIX of the display panel 100 are driven by the display driving circuit. The display driving circuit applies data of an input image to the pixels PIX for a vertical active time AT. The display driving circuit includes a data driving circuit 202, a gate driving circuit (or a scan driving circuit) 204, and a timing controller 206.

Digital video data RGB of an input image is input to the timing controller 206 in synchronization with timing signals Vsync, Hsync, DE, and MCLK for the vertical active time AT. The data driving circuit 202 converts the digital video data RGB received from the timing controller 206 into gamma compensation voltages and outputs the data voltage for the vertical active time AT. The data voltage output from the data driving circuit 202 is supplied to the pixels PIX through the data lines D1 to Dm for the vertical active time AT. Data of a new input image is not input to the data driving circuit 202 for a vertical blank time VB.

The gate driving circuit 204 is driven for the vertical active time AT. More specifically, the gate driving circuit 204 sequentially supplies a gate pulse (or a scan pulse) synchronized with the data voltage to the gate lines G1 to Gn and selects lines of the display panel 100, to which the data voltage is applied. The gate pulse swings between a gate high voltage VGH and a gate low voltage VGL. The gate driving circuit 204 does not generate the gate pulse for the vertical blank time VB. Thus, the data driving circuit 202 and the gate driving circuit 204 do not generate a new output for the vertical blank time VB under the control of the timing controller 206.

The timing controller 206 transmits the digital video data RGB of the input image received from a host system (not shown) to the data driving circuit 202 in synchronization with the timing signals Vsync, Hsync, DE, and MCLK. The digital video data RGB of the input image is synchronized with a data enable signal DE and is input to the timing controller 206 for the vertical active time AT. On the other hand, the digital video data RGB of the input image and the data enable signal DE are not input to the timing controller 206 for the vertical blank time VB.

The host system may be implemented as one of a television system, a set-top box, a navigation system, a DVD player, a Blu-ray player, a personal computer (PC), a home theater system, and a phone system. The host system includes a system on chip (SoC) including a scaler embedded therein and thus converts the digital video data of the input image into a format suitable for displaying on the display panel 100. The host system transmits the digital video data and the timing signals Vsync, Hsync, DE, and MCLK to the timing controller 206. The host system runs an application associated with coordinate information XY of a touch input or a gesture input received from the sensor driving circuit 300.

The timing signals Vsync, Hsync, DE, and MCLK input to the timing controller 206 include a vertical sync signal Vsync, a horizontal sync signal Hsync, a data enable signal DE, and a main clock MCLK. The timing controller 206 generates timing control signals for controlling operation timings of the data driving circuit 202 and the scan driving circuit 204 using the timing signals Vsync, Hsync, DE, and MCLK.

The timing controller 206 does not reduce the vertical active time AT, in which new data is applied to the pixels, and controls the vertical active time AT as much as the general display devices. In other words, the timing controller 206 does not secure a touch sensing period or a gesture sensing period by modulating the timing signals Vsync, Hsync, DE, and MCLK and reducing the vertical active time AT. Thus, the display device according to the embodiment of the invention does not reduce a data charge time of the pixels so as to secure the touch sensing period or the gesture sensing period.

The sensor driving circuit 300 applies a gesture sensing driving signal SP to the common voltage of the display panel 100 for the vertical blank time VB, in which there is no data of the input image, and analyzes a change amount of the gesture sensing driving signal SP, thereby deciding a gesture input. The gesture input is position input of an object, which does not contact the screen of the display panel 100 and is positioned at the front of the screen of the display panel 100. On the other hand, a touch input is position input of an object contacting the screen of the display panel 100. The display device according to the embodiment of the invention does not sense the touch input and senses the gesture input for the vertical blank time VB.

The sensor driving circuit 300 analyzes the gesture sensing driving signal SP using a predetermined gesture recognition algorithm. More specifically, the sensor driving circuit 300 decides that the gesture input is generated when the change amount of the gesture sensing driving signal SP is equal to or greater than a predetermined threshold value. The gesture recognition algorithm may use a known algorithm.

The common electrode means an electrode commonly connected to all of the pixels inside the screen (i.e., a display area shown in FIG. 4) of the display panel. For example, the common electrode may be the common electrode, to which the common voltage Vcom is supplied, in the LCD shown in FIG. 2, or the common electrode, to which the high potential pixel power voltage VDD and the low potential pixel power voltage VSS are supplied, in the OLED display shown in FIG. 3. Namely, the common voltages Vcom, VDD, and VSS of the pixels are supplied to the common electrode for the vertical active time AT. On the other hand, the gesture sensing driving signal SP is input to the common electrode for the vertical blank time VB.

If the common electrode is not divided inside the display panel and is connected to all of the pixels inside the screen (i.e., the display area shown in FIG. 4) of the display panel, the sensor driving circuit 300 does not decide a direction or a distance of the gesture input for the vertical blank time VB and may decide only whether or not there is the gesture input. In this instance, because the host system may decide whether or not there is the gesture input, it may be used in a simple conversion function, for example, power-on or power-off.

Figure 4:
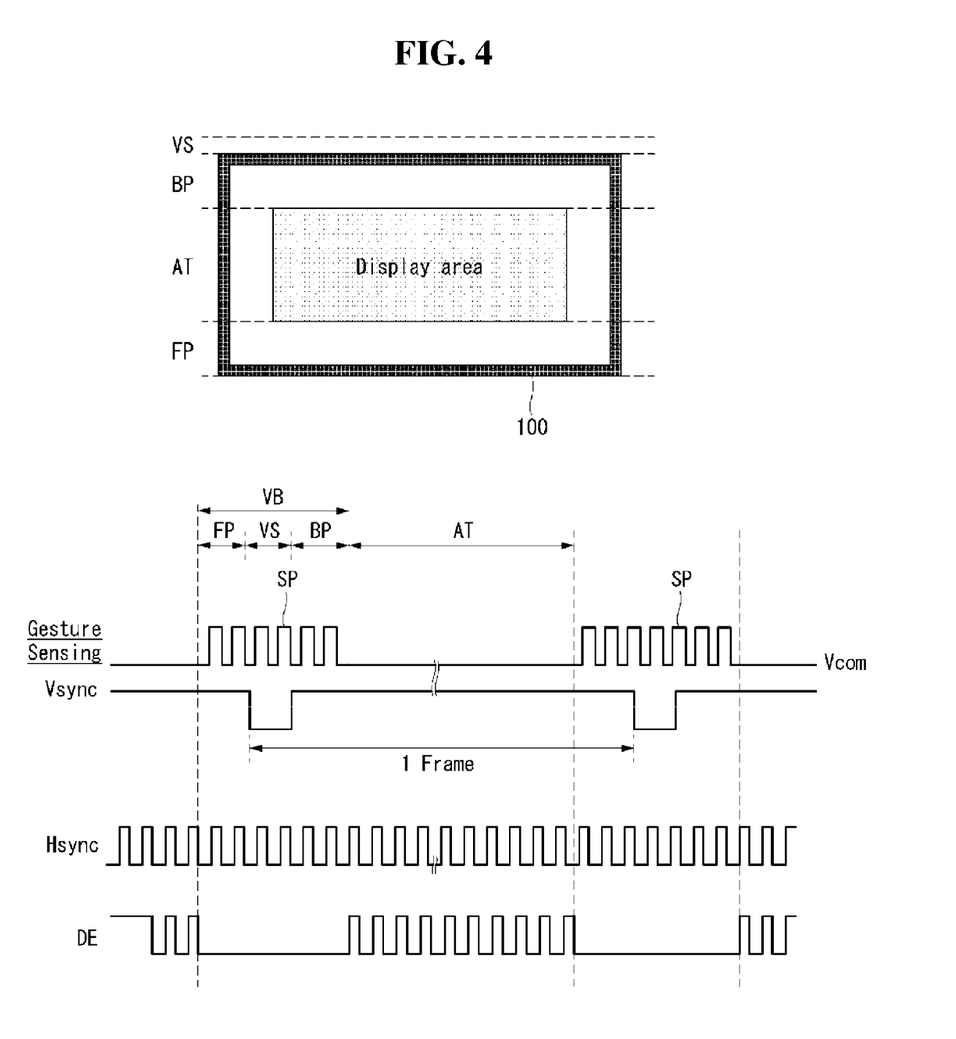
FIG. 4 shows gesture sensing timing according to an exemplary embodiment of the invention in display timing of video electronics standards association (VESA) standard.

A voltage of the gesture sensing driving signal SP may be properly set in consideration of a height capable of sensing or an intensity of an electric field. In the LCD, the gesture sensing driving signal SP is generated at a voltage greater than the common voltage Vcom as shown in FIGS. 2 and 4. The gesture sensing driving signal SP may be generated at the same voltage as a touch sensing driving signal applied to a capacitive sensor, which was used in an existing touch screen, or may be generated at a voltage greater than the touch sensing driving signal. Further, the gesture sensing driving signal SP may be generated as a signal of a multistep waveform, in which an initial voltage is set to a high value.

FIG. 4 shows gesture sensing timing according to the embodiment of the invention in display timing of video electronics standards association (VESA) standard.

As shown in FIG. 4, the data enable signal DE is synchronized with data of the input image. A period of one pulse of the data enable signal DE is one horizontal period, and a high logic period of the data enable signal DE indicates data input timing on one line. One horizontal period is a horizontal address time required to apply data to pixels on one line of the display panel 100.

The data enable signal DE and the data of the input image are input for the vertical active time AT and are not input for the vertical blank time VB. The vertical active time AT is a vertical address time required to display data corresponding to an amount of one frame on all of the pixels of the display area of the display panel 100, on which an image is displayed. One frame period is a time required to display the data of one frame on the display panel 100 and is equal to a sum of one vertical active time AT and one vertical blank time VB.

The vertical blank time VB includes a vertical sync time VS, a vertical front porch FP, and a vertical back porch BP. The vertical sync time VS is a time ranging from a falling edge to a rising edge of the vertical sync signal Vsync and indicates start timing (or end timing) of one screen.

The vertical blank time VB is equal to or greater than about 475 μs in full high definition (FHD) resolution. For the vertical blank time VB, several tens to several hundreds of gesture sensing operations may be performed.

The vertical front porch FP is a time ranging from a falling edge of the last data enable signal DE indicating data timing of the last line in the data of one frame to a start time point of the vertical blank time VB. The vertical back porch BP is a time ranging from an end time point of the vertical blank time VB to a rising edge of a first data enable signal DE indicating data timing of a first line in the data of one frame.

The display driving circuit applies the data of the input image to the pixels for the vertical active time AT. The sensor driving circuit 300 applies the gesture sensing driving signal SP to the common electrode of the display panel 100 for the vertical blank time VB and senses the gesture input.

Figure 5:
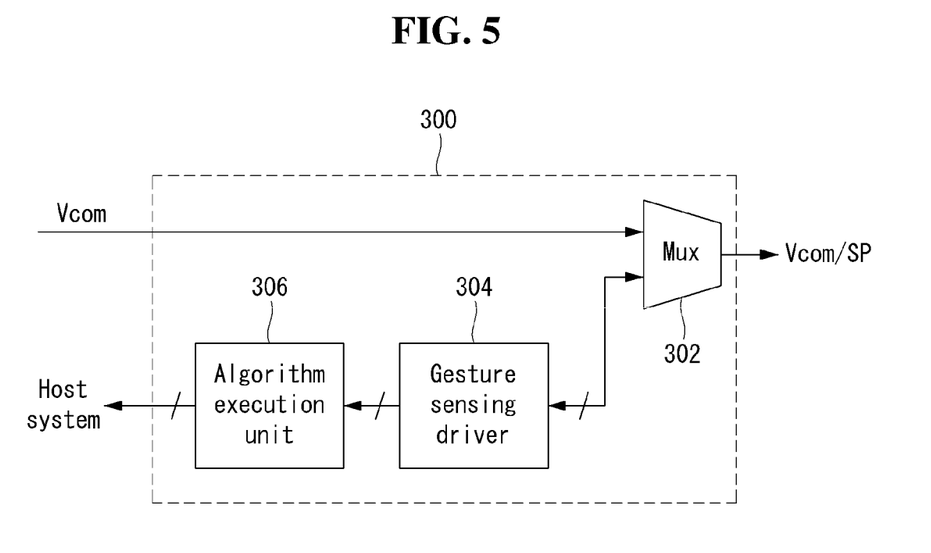
FIG. 5 is a block diagram showing in detail a sensor driving circuit shown in FIG. 1.

FIG. 5 is a block diagram showing in detail the sensor driving circuit 300.

As shown in FIG. 5, the sensor driving circuit 300 includes a multiplexer 302, a gesture sensing driver 304, and an algorithm execution unit 306.

The multiplexer 302 supplies the common voltages Vcom, VDD, and VSS to the common electrode of the display panel 100 for the vertical active time AT and supplies the gesture sensing driving signal SP to the common electrode of the display panel 100 for the vertical blank time VB.

The gesture sensing driver 304 generates the gesture sensing driving signal SP for the vertical blank time VB and supplies the gesture sensing driving signal SP to the multiplexer 302. The gesture sensing driver 304 converts a change amount of the gesture sensing driving signal SP received from the multiplexer 302 to digital data using an analog-to-digital converter (ADC) and transmits the digital data to the algorithm execution unit 306.

The algorithm execution unit 306 compares the digital data received from the gesture sensing driver 304 with a predetermined threshold value. The algorithm execution unit 306 decides whether the gesture input is generated when the change amount of the gesture sensing driving signal SP is equal to or greater than the predetermined threshold value, and generates an interrupt signal. If the common electrode is divided into a plurality of common electrodes and direction and space coordinates of the gesture input are sensed, the algorithm execution unit 306 may transmit space coordinates of a gesture input position to the host system, when the gesture input is sensed. The algorithm execution unit 306 may be implemented as a microcontroller unit (MCU) and a memory.

Figure 6:
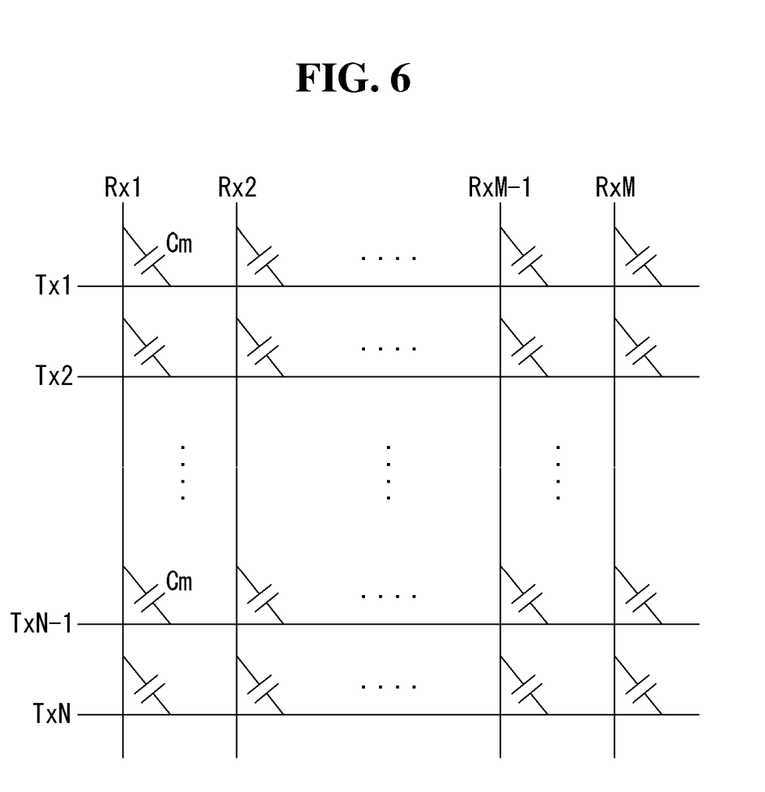
FIG. 6 is an equivalent circuit diagram showing an example of dividing a common electrode of a display panel to implement a mutual capacitive sensor matrix.
Figure 7:
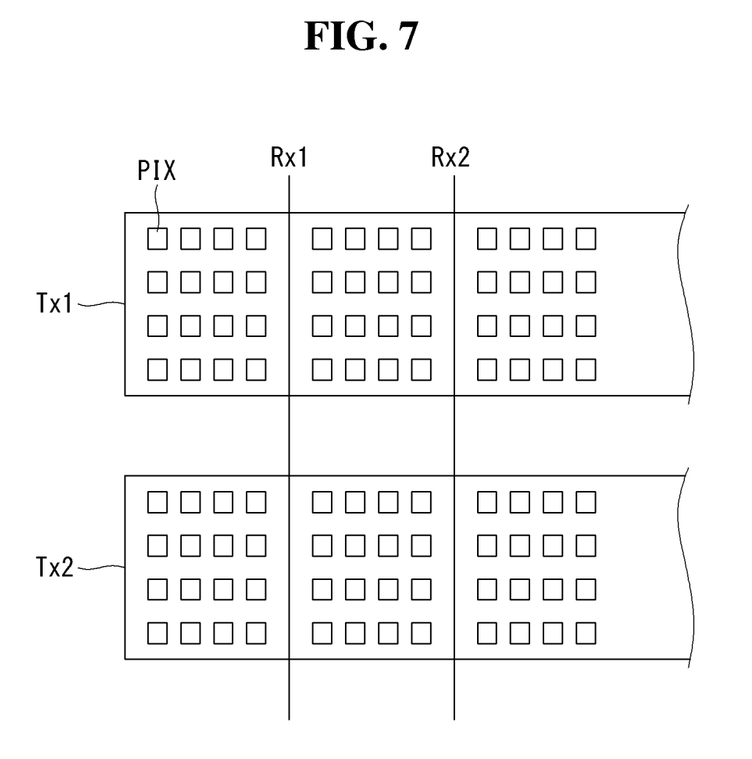
FIG. 7 is an enlarged plane view of a portion of a mutual capacitive sensor matrix.
Figure 8:
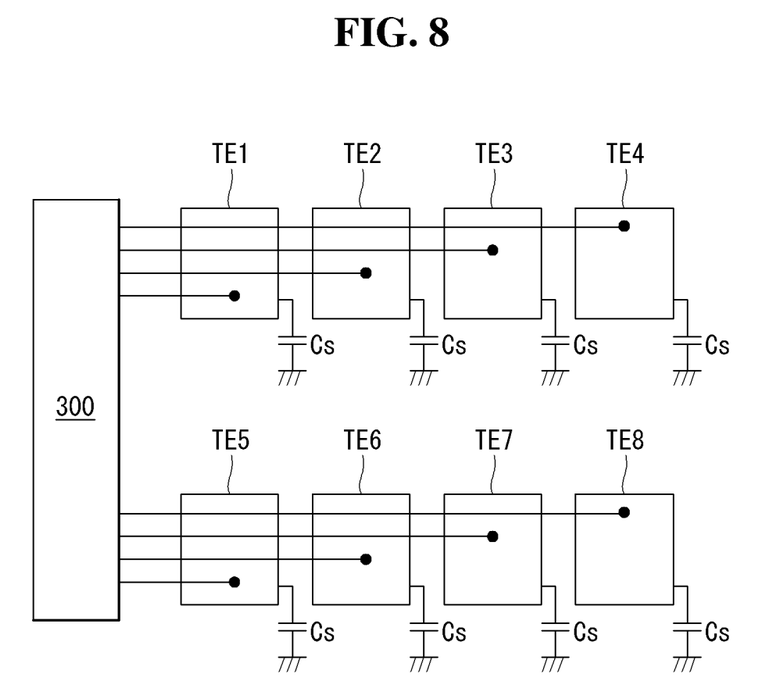
FIG. 8 is an equivalent circuit diagram showing an example of dividing a common electrode of a display panel to implement a self-capacitive sensor matrix.

The common electrode of the display panel 100 may be divided as shown in FIGS. 6 to 8, so that the recognition of various operations is possible.

FIG. 6 is an equivalent circuit diagram showing an example of dividing the common electrode of the display panel to implement a mutual capacitive sensor matrix. FIG. 7 is an enlarged plane view of a portion of the mutual capacitive sensor matrix.

As shown in FIGS. 6 and 7, the mutual capacitive sensor matrix includes Tx lines Tx1 to TxN and Rx lines Rx1 to RxM which are perpendicular to the Tx lines Tx1 to TxN with a dielectric layer interposed therebetween.

The common electrode of the display panel may be divided into the Tx lines Tx1 to TxN or may be divided into the Tx lines Tx1 to TxN and the Rx lines Rx1 to RxM. Thus, the common electrode supplies the common voltages Vcom, VDD, and VSS to the pixels for the vertical active time AT and is used as the plurality of sensor electrodes for the vertical blank time VB.

The Tx lines Tx1 to TxN and the Rx lines Rx1 to RxM have the size larger than the pixel PIX and are connected to the plurality of pixels. A mutual capacitance Cm is formed at each crossing of the Tx lines Tx1 to TxN and the Rx lines Rx1 to RxM.

For the vertical blank time VB, the sensor driving circuit 300 applies the gesture sensing driving signal SP to the Tx lines Tx1 to TxN divided from the common electrode and receives the gesture sensing driving signal SP through the Rx lines Rx1 to RxM. The Rx lines Rx1 to RxM are implemented by the divided common electrodes or are implemented by the data lines D1 to Dm or the gate lines G1 to Gn connected to the pixels. Because the pixels hold previous data for the vertical blank time VB, the data lines D1 to Dm or the gate lines G1 to Gn may be used as the Rx lines Rx1 to RxM for the vertical blank time VB. Thus, the display device according to the embodiment of the invention does not additionally form the Tx lines Tx1 to TxN and the Rx lines Rx1 to RxM when the mutual capacitive sensor is used for the gesture sensing, and may implement the Tx lines Tx1 to TxN and the Rx lines Rx1 to RxM using components of an existing pixel array.

FIG. 8 is an equivalent circuit diagram showing an example of dividing the common electrode of the display panel to implement a self-capacitive sensor matrix.

As shown in FIG. 8, the self-capacitive sensor matrix includes sensor electrodes TE1 to TEi arranged in a matrix form and sensor lines respectively connected to the sensor electrodes TE1 to TEi.

The common electrode of the display panel may be divided into the sensor electrodes TE1 to TEi and the sensor lines. Thus, the common electrode supplies the common voltages Vcom, VDD, and VSS to the pixels for the vertical active time AT and is used as the plurality of sensor electrodes for the vertical blank time VB.

For the vertical blank time VB, the sensor driving circuit 300 supplies the gesture sensing driving signal SP to the sensor electrodes TE1 to TEi which are divided from the common electrode. and receives the gesture sensing driving signal SP through the sensor lines.

As described above, because the embodiment of the invention does not reduce the vertical active time in one frame period of the display device, the embodiment of the invention does not affect the display drive. The embodiment of the invention does not add a separate sensor for the gesture sensing to the display panel and senses the gesture during the vertical blank time using the common electrode commonly connected to the pixels.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device having one frame period divided into a vertical active time, in which data of an input image is input, and a vertical blank time, in which the data of the input image is not input based on a vertical sync signal, comprising:
  a display panel including a common electrode commonly connected to pixels;
  a display driving circuit configured to apply a data voltage to the pixels during the vertical active time; and
  a sensor driving circuit configured to apply a gesture sensing driving signal to the common electrode during a portion of first vertical blank time corresponding to one frame period and a portion of second vertical blank time corresponding to another one frame period subsequent to the one frame period and sense a gesture input, the portion of second vertical blank time being continuously subsequent on the portion of first vertical blank time,
  wherein the vertical sync signal comprises a vertical sync pulse within the portion of second vertical blank time, and
  wherein a gesture sensing period is longer than a width of the vertical sync pulse, the gesture sensing period being a time for which the gesture sensing driving signal of a plurality of pulse waves during an entirety of the vertical blank time including a vertical sync time corresponding to a pulse width of the vertical sync pulse is applied.

2. The display device of claim 1, wherein the common electrode is not divided inside the display panel.

3. The display device of claim 2, wherein the sensor driving circuit determines only whether or not there is the gesture input for the vertical blank time.

4. The display device of claim 1, wherein the common electrode is divided into a plurality of common electrodes.

5. The display device of claim 4, wherein the divided common electrode operates as a mutual capacitive sensor matrix for the vertical blank time.

6. The display device of claim 4, wherein the divided common electrode operates as a self-capacitive sensor matrix for the vertical blank time.

7. The display device of claim 1, wherein the sensor driving circuit determines the gesture input for the vertical blank time and outputs coordinates of a gesture input position.

8. The display device of claim 1, wherein the gesture sensing period further includes a vertical front porch before the vertical sync time and a vertical back porch after the vertical sync time.

9. The display device of claim 1, wherein the gesture sensing driving signal includes a signal of a multistep waveform, in which an initial voltage is set to a high value.

10. The display device of claim 1, wherein the gesture input is a position input of an object that does not contact a screen of the display panel, decide if the gesture input is sensed depending on whether or not a change amount of the gesture sensing driving signal is equal to or greater than a threshold value, and when the gesture input is sensed, determine a movement of the gesture input based on outputs received from the plurality of common electrodes applied with the gesture sensing driving signal.

11. The display device of claim 1, wherein a gesture sensing period is longer than a width of the vertical sync pulse, the gesture sensing period being a time for which the gesture sensing driving signal of a multistep waveform is applied.

12. A method for driving a display device including a common electrode commonly connected to pixels, in which one frame period is divided into a vertical active time, in which data of an input image is input, and a vertical blank time, in which the data of the input image is not input based on a vertical sync signal, the method comprising:
  applying a data voltage to the pixels for the vertical active time; and
  applying a gesture sensing driving signal to the common electrode for a portion of first vertical blank time corresponding to one frame period and a portion of second vertical blank time corresponding to another one frame period subsequent to the one frame period and sense a gesture input, the portion of second vertical blank time being continuously subsequent on the portion of first vertical blank time,
  wherein the vertical sync signal comprises a vertical sync pulse within the portion of second vertical blank time, and
  wherein a gesture sensing period is longer than a width of the vertical sync pulse, the gesture sensing period being a time for which the gesture sensing driving signal of a plurality of pulse waves during an entirety of the vertical blank time including a vertical sync time corresponding to a pulse width of the vertical sync pulse is applied.

13. The method of claim 12, wherein the applying of the gesture sensing driving signal to the common electrode for the vertical blank time and the sensing of the gesture input includes determining only whether there is the gesture input for the vertical blank time, and
  wherein the common electrode is not divided inside the display panel.

14. The method of claim 13, wherein the applying of the gesture sensing driving signal to the common electrode for the vertical blank time and the sensing of the gesture input includes:
  deciding the gesture input for the vertical blank time and generating coordinates of a gesture input position; and
  dividing the common electrode into a plurality of common electrodes.

15. The method of claim 12, wherein the gesture sensing period further includes a vertical front porch before the vertical sync time and a vertical back porch after the vertical sync time.

16. The method of claim 12, wherein the gesture sensing driving signal includes a signal of a multistep waveform, in which an initial voltage is set to a high value.

17. The method of claim 12, wherein the vertical sync signal comprises a vertical sync pulse within the vertical blank time, and wherein the gesture sensing period being a time for which the gesture sensing driving signal of a multistep waveform is applied.

* * * * *